(12) United States Patent
Holstein et al.

(10) Patent No.: US 8,845,231 B2
(45) Date of Patent: Sep. 30, 2014

(54) RUN-OF RIVER POWER PLANT

(75) Inventors: Benjamin Holstein, Heidenheim (DE);
Jorg Lochschmidt, Ulm (DE); Helmut Bronowski, Heidenheim (DE)

(73) Assignee: Voith Patent GmbH, Heidenheim (DE)

( * ) Notice: Subject to any disclaimer, the term of this patent is extended or adjusted under 35 U.S.C. 154(b) by 352 days.

(21) Appl. No.: 13/318,668

(22) PCT Filed: Apr. 5, 2011

(86) PCT No.: PCT/EP2011/001675
§ 371 (c)(1),
(2), (4) Date: Feb. 3, 2012

(87) PCT Pub. No.: WO2011/134585
PCT Pub. Date: Nov. 3, 2011

(65) Prior Publication Data
US 2013/0140825 A1      Jun. 6, 2013

(30) Foreign Application Priority Data
Apr. 29, 2010   (DE) .................. 10 2010 018 806

(51) Int. Cl.
*F03B 13/10* (2006.01)
*E02B 9/02* (2006.01)
*F03B 13/08* (2006.01)
*E02B 9/04* (2006.01)

(52) U.S. Cl.
CPC ............. *F03B 13/10* (2013.01); *F05B 2240/40* (2013.01); *Y02E 10/22* (2013.01); *E02B 9/022* (2013.01); *F05B 2240/133* (2013.01); *F03B 13/08* (2013.01); *E02B 9/04* (2013.01); *F05B 2240/97* (2013.01)
USPC ............................................. 405/78; 290/54

(58) Field of Classification Search
USPC ............ 405/78; 290/43, 54; 60/398; 415/3.1, 415/906, 121.2
See application file for complete search history.

(56) References Cited

U.S. PATENT DOCUMENTS

| 1,730,578 | A | * | 10/1929 | Lawaczeck | 60/398 |
|---|---|---|---|---|---|
| 3,750,001 | A | * | 7/1973 | McCloskey | 322/35 |
| 4,149,092 | A | * | 4/1979 | Cros | 290/54 |
| 2012/0235416 | A1 | * | 9/2012 | Rutschmann et al. | 290/54 |

FOREIGN PATENT DOCUMENTS

| DE | 759 178 | 8/1953 |
|---|---|---|
| DE | 1 080 935 | 4/1960 |
| DE | 1 634 007 | 2/1971 |
| DE | 36 37 083 | 5/1988 |
| DE | 299 14 306 | 12/1999 |
| DE | 102 31 744 | 1/2004 |
| DE | 10 2009 037 196 | 10/2010 |
| EP | 1 455 087 | 9/2004 |
| FR | 2571101 A1 * | 4/1986 |

(Continued)

*Primary Examiner* — Sunil Singh
(74) *Attorney, Agent, or Firm* — Farjami & Farjami LLP

(57) ABSTRACT

The invention concerns a run-of-river power plant with the following components or features:
at least one module or several stand-alone modules, which are arranged close to one another in the flow direction, respectively comprising at least one energy unit;
each energy unit comprises a water turbine and a generator;
every module includes an upstream retaining wall as well as a downstream bearing wall;
an intermediate space is situated between both walls;
a rake, which extends between the upper edge of the retaining wall and the upper edge of the bearing wall and covers the intermediate space;
a suction channel is connected to the energy unit.

20 Claims, 9 Drawing Sheets

(56) References Cited

FOREIGN PATENT DOCUMENTS

| | | |
|---|---|---|
| FR | 2 865 226 | 7/2005 |
| JP | 57-124076 | 8/1982 |
| JP | 59054778 A * | 3/1984 |
| JP | 60195383 A * | 10/1985 |

* cited by examiner

RUN-OF RIVER POWER PLANT

This is a U.S. national phase application, which is based on, and claims priority from, PCT application Serial No. PCT/EP2011/001675, filed Apr. 5, 2011, which claims priority from foreign application Serial No. 10 2010 018 806.9, filed Apr. 29, 2010, in Germany.

The invention concerns a run-of-river power plant for using the energy of the flowing water.

Such run-of-river power plants are available in a large number of variations.

The invention concerns a run-of-river power plant, which can also be used with flows with minimal energy production. We are mainly dealing with power plants with minimal falling height and significant volume stream, so-called hydroelectric power plants. The power plants should be designed in such a way that they are overflowed for their greatest part and hence remain hidden to the eyes of the observer and hardly disturb the course of the river in case of high water. With such application cases, the irregular production of water should be calculated while taking into account the season of the year, as well as spurious particles, which are trapped by the current, such as stones, driftwood and so forth. The aim is hence to provide a solution which is as simple and little accident prone as possible.

The construction of run-of-river power plants is basically quite costly. Consequently, the means to be implemented cannot be anticipated with precision. An important variable is for example the quality of the riverbed. If it consists of bedrock, the means to be implemented will be particularly large. Moreover, extensive measures are necessary during the construction such as the diversion of the whole river from the settled riverbed with a bed then created artificially. Sometimes, only a portion of the current is diverted, so that to assist the construction of the power plant, a portion of the riverbed can be drained. All these measures are extraordinarily costly.

The object of the invention is then to offer a run-of-river power plant which is easy to build, which can be erected cost efficiently, which is insensitive with respect to so-called bed-load such as stones, driftwood and which can be erected easily, quickly and cost efficiently. Whenever possible, the sheeting of the foundation pit mentioned above should be dispensed with.

This object is satisfied by the characteristics of the independent claims.

The main idea of the independent claim of the equipment is to provide a plurality of modules which are arranged close to one another in the flow direction. Every module carries at least one energy unit, comprising a turbine and a generator. A suction pipe or a suction channel connects in a conventional manner to the energy unit.

The otherwise usual dam, which contains several energy units, is hence divided. Every module can hence be totally self-sustained and erected individually, independent of the neighbouring module. A module can thus be erected after another. To do so, the ideal to start with a first module close to the shore, before installing the next neighbouring module, and so forth.

The claims of the method provide a detailed description.

The invention is described below with reference to the drawing. The following details are shown:

Figure 1:
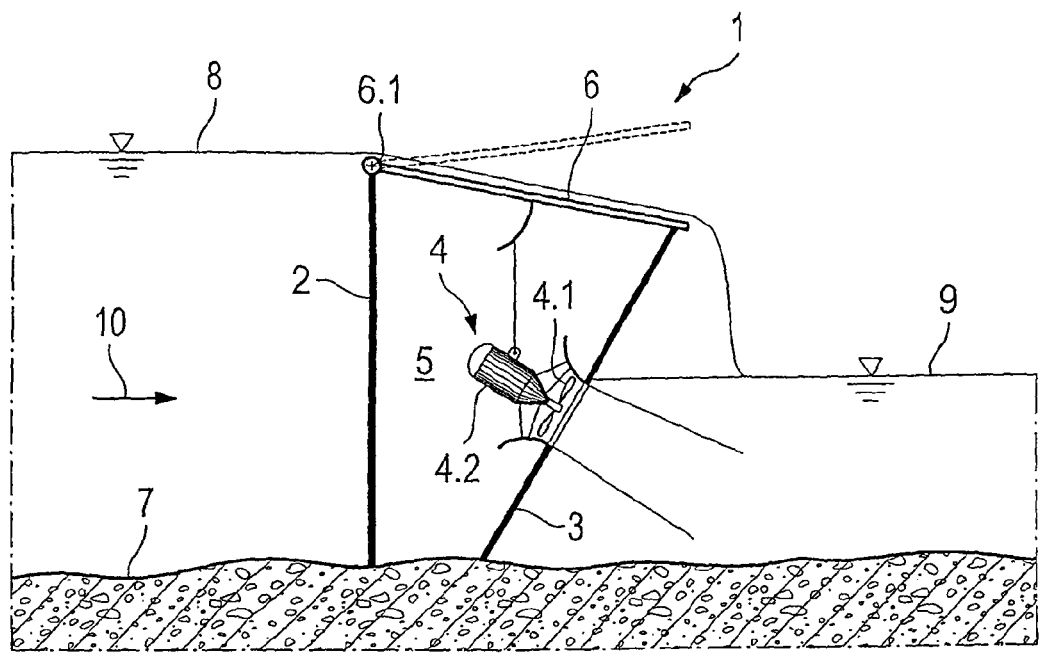
FIG. 1 shows a schematic illustration of a run-of-river power plant in front elevational view.

FIG. 1 shows a module 1 according to the invention. Said module comprises a retaining wall 2, a bearing wall 3 as well as an energy unit 4 carried by the bearing wall 3. The energy unit 4 contains a turbine 4,1 as well as a generator 4,2. Both have a common rotational axis.

The turbine is seamless. The rotor of the turbine is mounted in a concentric bushing to the rotational axis of the turbine. The turbine blades are fixed to the bushing with their radially external ends. The radially internal ends of the turbine blades form together a passage for the penetration of floating debris.

An intermediate space 5 is situated between the retaining wall 2 and the bearing wall 3. Said space can be covered by a rake 6. The rake is articulated to the upper edge of the retaining wall 2 can swivel around the joint 6.1. The dotted line shows the rake 6 in raised position. To disassemble the turbine, the rake can be raised even further upwards. The suspension point of the rake 6.1 can similarly be arranged correctly to the bearing wall 3.

The retaining wall 2 and the bearing wall 3 are anchored in the riverbed 7. The upper water 8 is dammed up against the retaining wall 2. Water flows over the rake 6 and falls from the upper edge of the bearing wall down to the underwater 9. The river flows in the direction of the arrow 10. During operation, the rake 6 is more advantageously tilted to the underwater. The dirt is drawn along the rake rods into the underwater 9. A separate rake cleaning machine can be dispensed with.

FIG. 3 shows again a bearing wall 3, made of a concrete body, as well as an energy unit 4.

The energy unit 4 is mounted at the upper end of the inlet opening of the suction channel 13. See suspension journals 13.1. The energy unit 4 has a crane hook 4.1 on the generator housing, to be hoisted during maintenance works or similar. The inlet opening of the suction channel 13 is designed as a seat. Said unit exhibits a circular seat body (non represented), on which rests the housing of the energy unit 4 in operating condition.

The bearing wall 3 includes a vertical guide groove 3.1. A suspension hook, which is an integral part of an inlet funnel 4.2, can travel up and down in said guide groove. The hook encompasses the suspension journal 13.1. in the lower position illustrated here. The guide groove facilitates the assembly of the turbine by means of a crane.

With said construction, the energy unit 4 need not be fixed more extensively. Said unit is pressed against the seat at the inlet opening of the suction channel by virtue of its weight in combination with the suitably positioned suspension journal 13.1.

Figure 2:
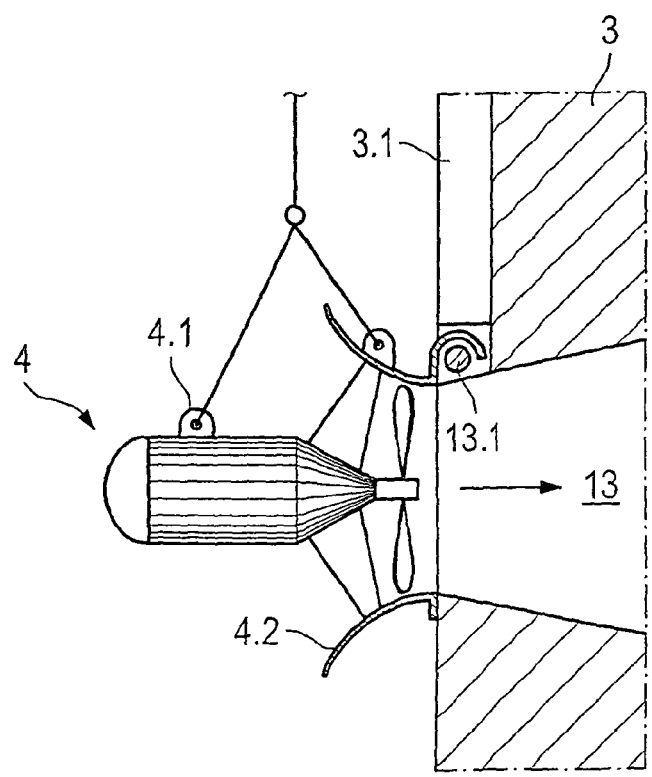
FIG. 2 shows important parts of a second run-of-river power plant in front elevational view.
Figure 3:
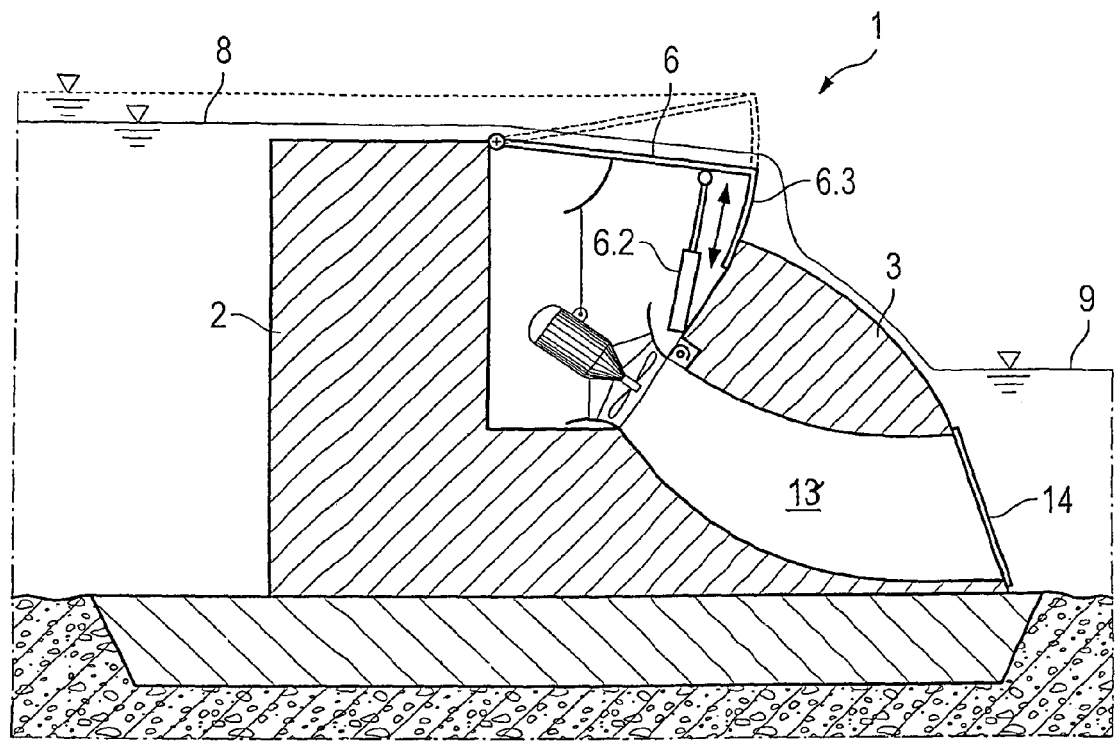
FIG. 3 shows a third run-of-river power plant in front elevational view.

Module 1 according to FIG. 3 is built up substantially identical to the module 1 according to FIG. 2. The suction channel 13 is however slightly curved. The 6 can be swung up and down by means of a lifting device 6.2. The free end of the rake 6 moreover has a skirt 6.3. Said skirt slides along the bearing wall 3 when the rake closes. The rake 6 can be used for adjusting the gauge of the upper water. The rake 6 is cleaned when in folded state. The dirt is carried away as soon as the rake 6 is tilted to the underwater 9 and overflowed.

The rake 6 fitted with the skirt 6.3 can be raised in such a way that the level of the upper water 8 is raised. This enables to regulate the upper water gauge. See the representation in dotted line of the upper water 8—see FIG. 3.

The embodiments according to FIGS. 1 to 3 clearly show that the rake 6 (seen in flow direction) drops downwards in operating condition. It is thus constantly overflowed with water. This enables to keep it extensively clean without resorting to separate cleaning devices.

The illustrated configuration of retaining wall 2 and bearing wall 3 is suitable for such a configuration. The upstream end of the rake 6 can here be articulated especially with its upstream end at the upper edge of the retaining wall 2, and can with its downstream end lie on or abut against the upper edge of the bearing wall 3. The upper edge of the retaining wall 2 hence lies at a greater geodetic height than the upper edge of the bearing wall 3.

Figure 4:
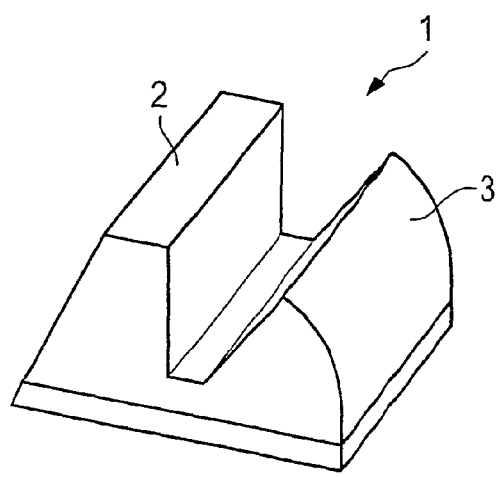
FIG. 4 shows important parts of a module made of concrete.

This also appears clearly on FIG. 4. FIG. 4 shows a module in perspective representation. Said module is cast in a single piece of concrete and for example filled with gravel. An intermediate space is situated between the retaining wall 2 and the bearing wall 3. The retaining wall 2 is substantially vertical. The bearing wall 3 conversely is limited on its upstream side by a tilted surface, and by a curved surface on its downstream side. The energy unit 4 can be arranged as described above on the tilted surface. By virtue of its own weight, the energy unit hence rests reliably on the tilted surface. The downstream-flowing water flows over the curved surface.

Figure 5:
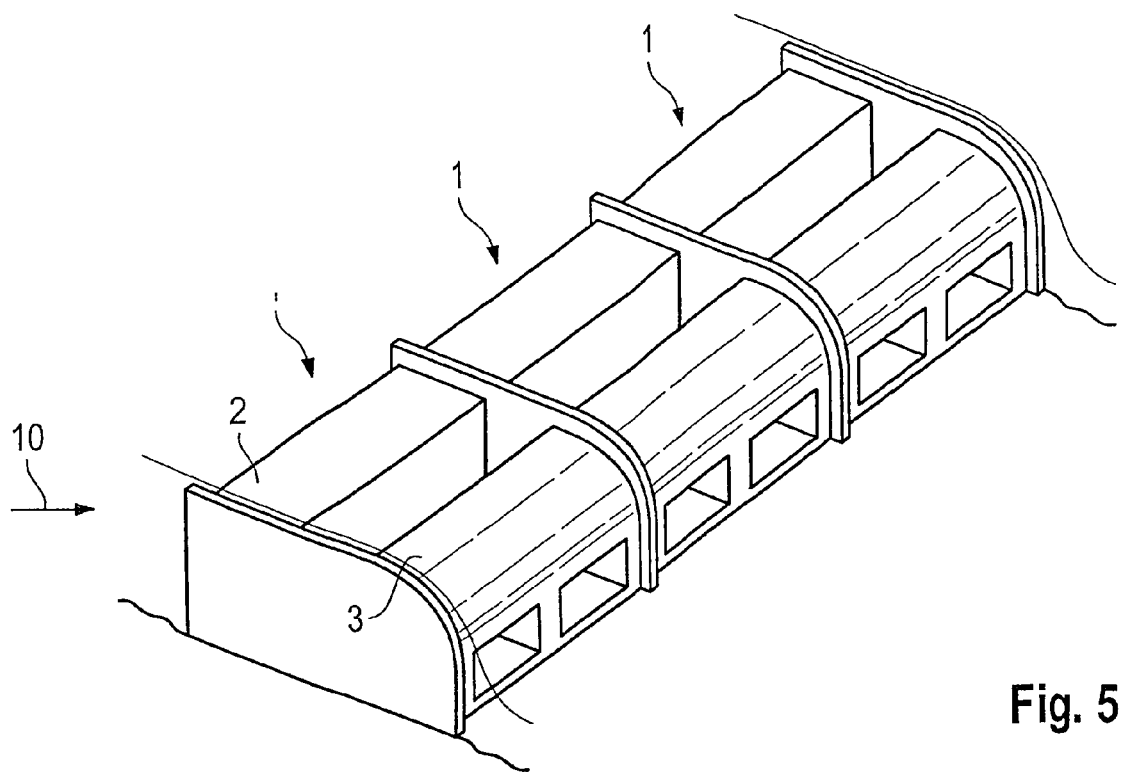
FIG. 5 shows three modules arranged close to one another in perspective representation.

FIG. 5 shows several modules. These are arranged side by side, hence crosswise to the flow direction 10 of the river.

Figure 6:
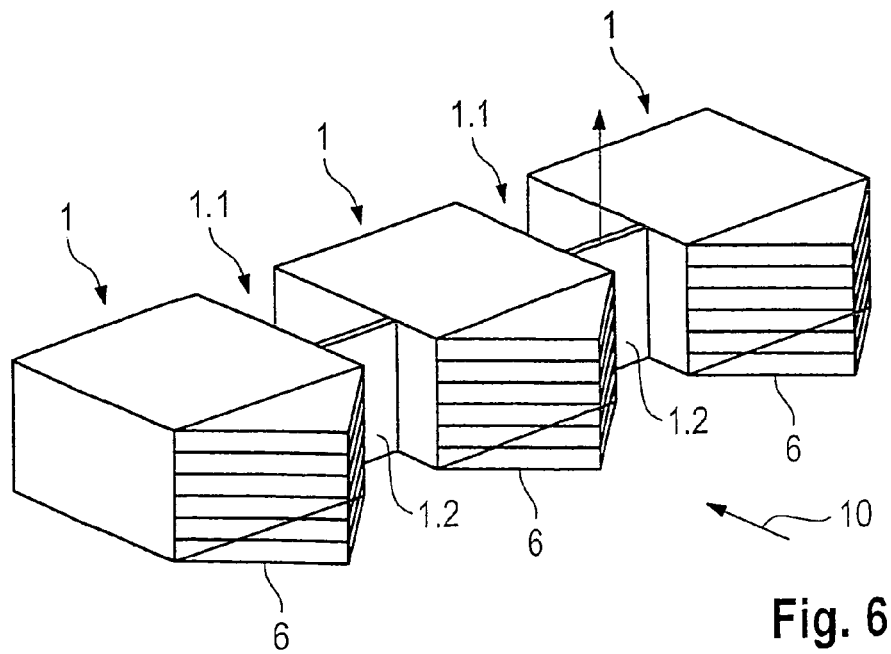
FIG. 6 shows three further modules arranged close to one another in perspective representation.

FIG. 6 again shows three modules, in a very simplified fashion. Every module is provided with an arrow rake 6. A free intermediate space 1.1 is situated between two neighbouring modules. Said space can be opened and closed by a shut-off device 1.2. The shut-off device 1.2 can for instance be a dam board. The intermediate space 1.1 serves as a gravel channel. Bedload and floating debris accumulate in front of the shut-off device 1.2. These must be removed from time to time. For that purpose, the dam boards 1.2 are hoisted from time to time in the direction of the vertical arrow. Floating debris or flotsam which has accumulated before the flap reaches into the underwater with the current.

When the dam boards 1.2 open, dirt is moreover carried away which has accumulated in the rakes 6.

Figure 7:
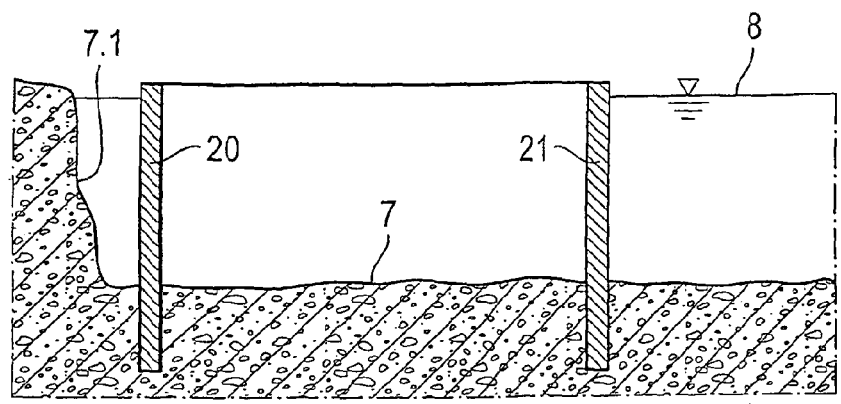
FIGS. 7 to 10 illustrate the important steps of a first method for erecting a module according to the invention in a riverbed.
Figure 8:
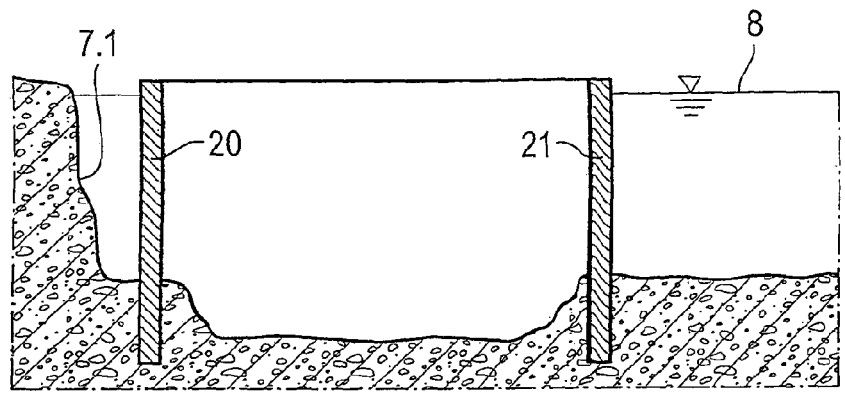
Figure 9:
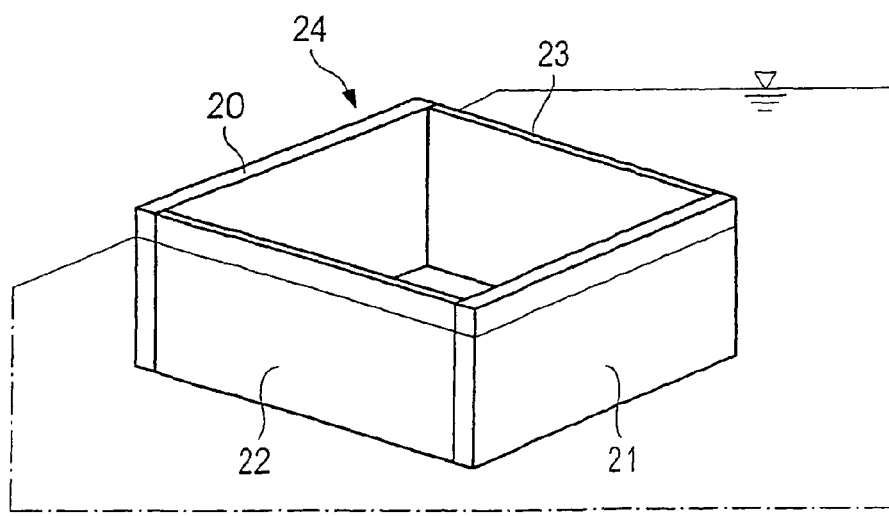

FIGS. 7 to 10 illustrate process steps for carrying out a first method for erecting modules. To do so, FIGS. 7 and 8 are vertical sections through a riverbed crosswise to the flow direction. The embankment 7.1 is clearly visible, as well as the riverbed 7.

In the work phase illustrated in FIG. 7, two sheet pile walls 20 and 21 are rammed and fixed into the riverbed. each sheet pile wall reaches upwards at least up to the upper water 8, possibly even protrudes over it.

The sheet pile walls 20, 21 are fixedly anchored in the riverbed 7. They remain in-situ and hence form a carrying constituent of the power plant. The sheet pile walls 20, 21 each have vertical grooves at their ends. Dam boards 22, 23 are pushed into said grooves. see FIG. 9. This generates a surrounded space, and hence a sheeting of the foundation pit for a first module. See FIG. 10. The foundation pit can now be pumped dry. Moreover, a bed to lay the foundations of the modules for later installation can be excavated and be anchored with lean concrete. a first module can now be lowered into the foundation pit and laid on the lean concrete foundations.

All the components aforementioned, that is to say the sheet pile walls 20, 21 as well as the dam boards 22, 23 are re-usable The sheet pile walls 20, 21 usually remain in the riverbed permanently. They form the carrying element for the whole dam.

Figure 10:
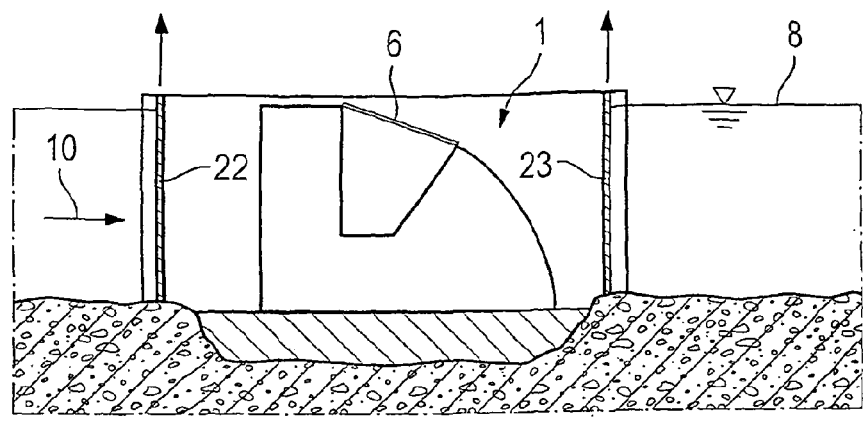

The dam boards conversely are pulled out of the vertical grooves aforementioned upon completion of the construction work (see the condition represented in FIG. 10). They can be re-used later for maintenance work on the corresponding modules. See in FIG. 10 both vertical upwards-directed arrows, which illustrate the extraction of the dam boards.

Moreover, only two dam boards 22, 23 are generally necessary. A first foundation pit is formed first of all, and then a second adjoining foundation pit is erected, in turn with one or several (new) sheet pile walls, but with the first mentioned dam boards 22, 23.

Figure 11:
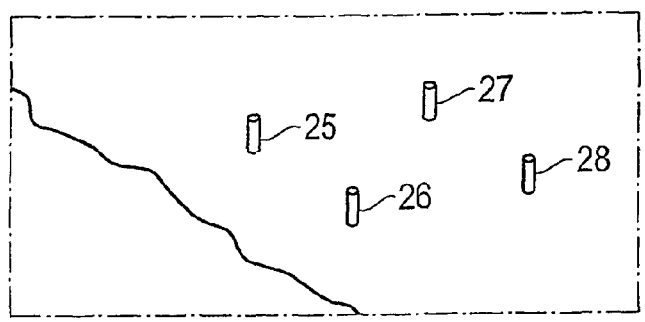
FIGS. 11 to 14 illustrate the important steps of a second construction method for erecting a module according to the invention in a riverbed.
Figure 12:
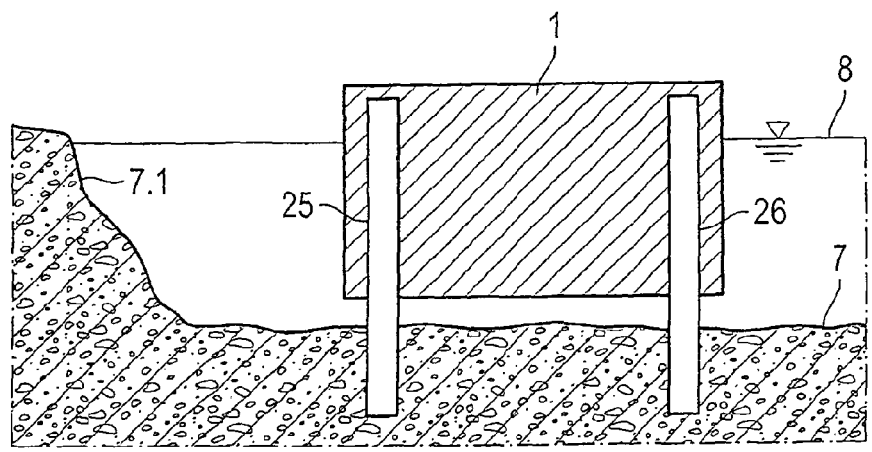

There is a second possibility without erecting a foundation pit. The procedure is as follows: The stakes 25 to 28 are first of all rammed into the riverbed—see FIG. 11. A first module 1 is mounted into the stakes and anchored on them with an interlocking fit. See FIGS. 12, 13 and 14.

Figure 13:
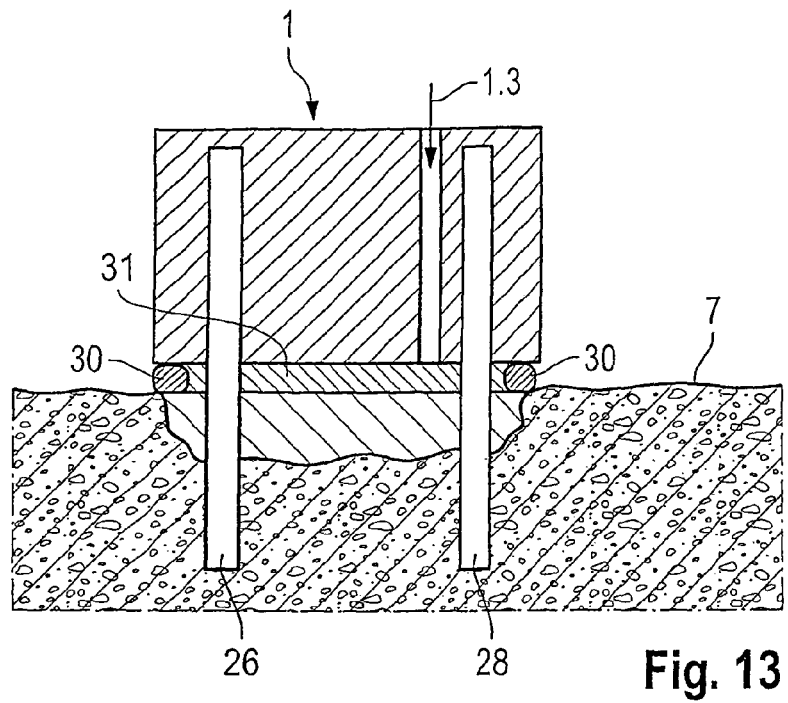
Figure 14:
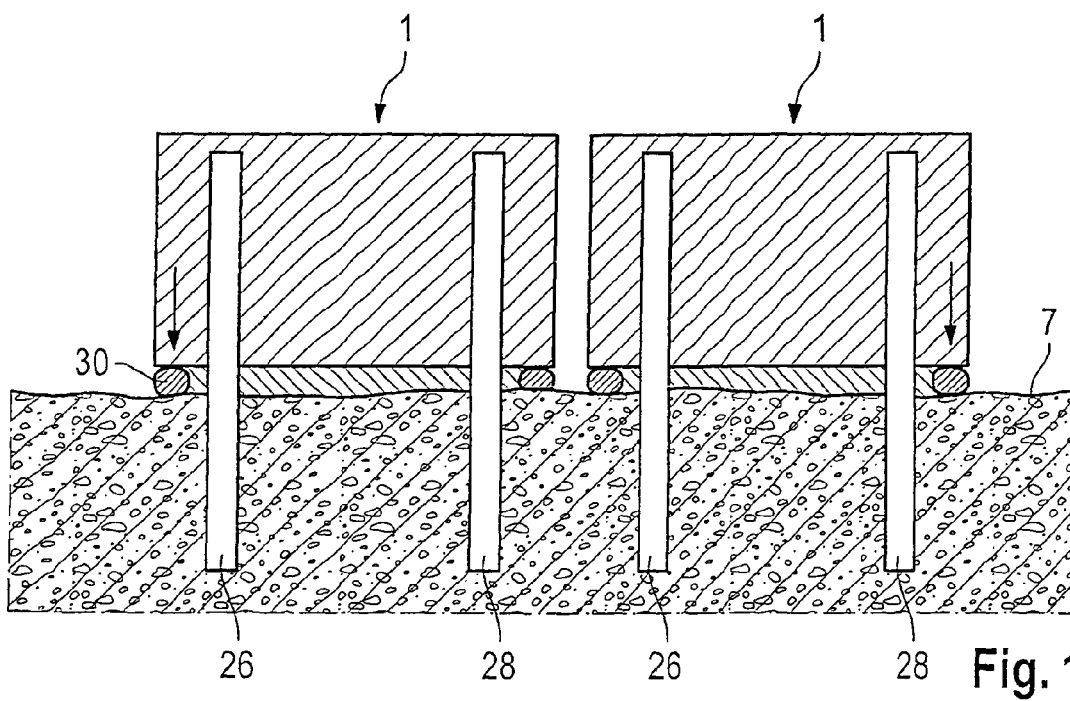
Figure 15:
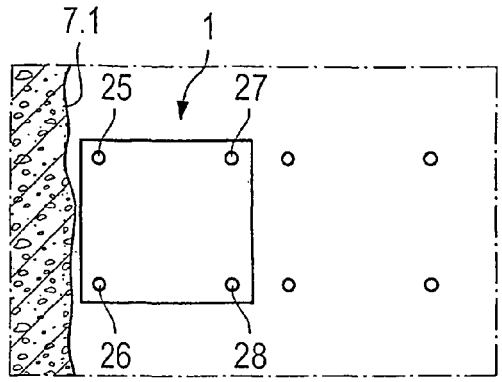
FIG. 15 shows a module, which is arranged and fixed to the riverbed by means of stakes, looking in the flow direction.
Figure 16:
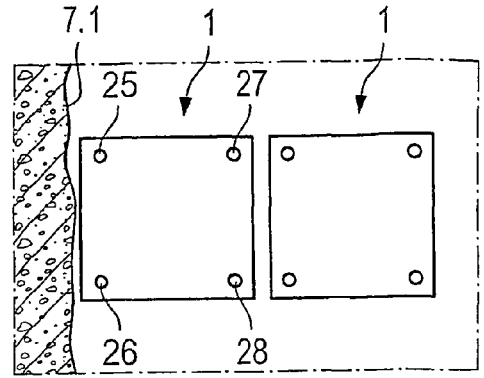
FIG. 16 shows an object similar to one according to FIG. 17, however with two modules.

As FIGS. 13 and 14 clearly show, a sealing member 30 is situated between the riverbed 7 and the module 1. Said member is a fabric hose filled with bentonite. It surrounds the corresponding module at its external circumference and hence encloses a space 31.

The space 31 is filled with an appropriate material, for instance with lean concrete, through an insertion channel 1.3. The pouring takes place under pressure, so that the foundation soil in the space 31 is solidified by casting cement. The space 31 can be filled and the foundation soil below the space 31 can be consolidated to prevent undermining of the module 1 by means of the known high-pressure soil stabilisation method called "Jet-Grouting". The module is thus protected against undermining.

The seal 30 can be inserted in many ways, for instance by fastening on the ground of the module 1 before mounting it into the stakes.

It goes without saying that walls are also used instead of the stakes. Incidentally, it is still used with the described mounting procedure of the modules 1 and the laying of foundations with the aid of the sealing 30.

Figure 17:
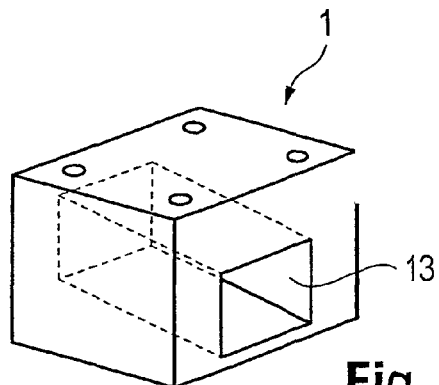
FIG. 17 shows a finished part in perspective representation, which is an integral part of a module.
Figure 18:
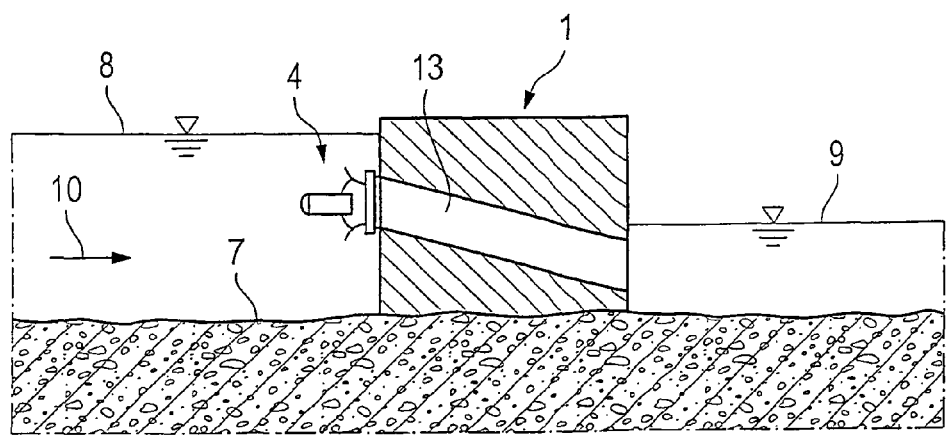
FIG. 18 shows the object of FIG. 15 in side view

FIGS. 17 and 18 illustrate examples of a finished part in a very schematic representation, FIG. 17 in a perspective view, and FIG. 18 in a vertical section positioned in flow direction.

The run-of-river power plant illustrated on FIGS. 19, 20 and 21 again has a retaining wall 2 and a bearing wall 3. A gravel channel 1.1 is situated under the module 1. Said channel may consist of a plurality of individual channels, running parallel to one another in the flow direction.

The free space 5 is again situated between both walls 2 and 3. The energy unit 4 is also located there. The facility has a rake 6. In the present case, said rake is articulated at the upper edge of the carrier body 3—see joint 6.1. But the joint could also be articulated on the upper edge of the retaining wall 2, as well as in FIGS. 1 and 3.

An air vane 40 is articulated on the same joint 6.1. Said vane extends over the full width of the module 1. It is used for regulating the upper water 8.

Figure 19:
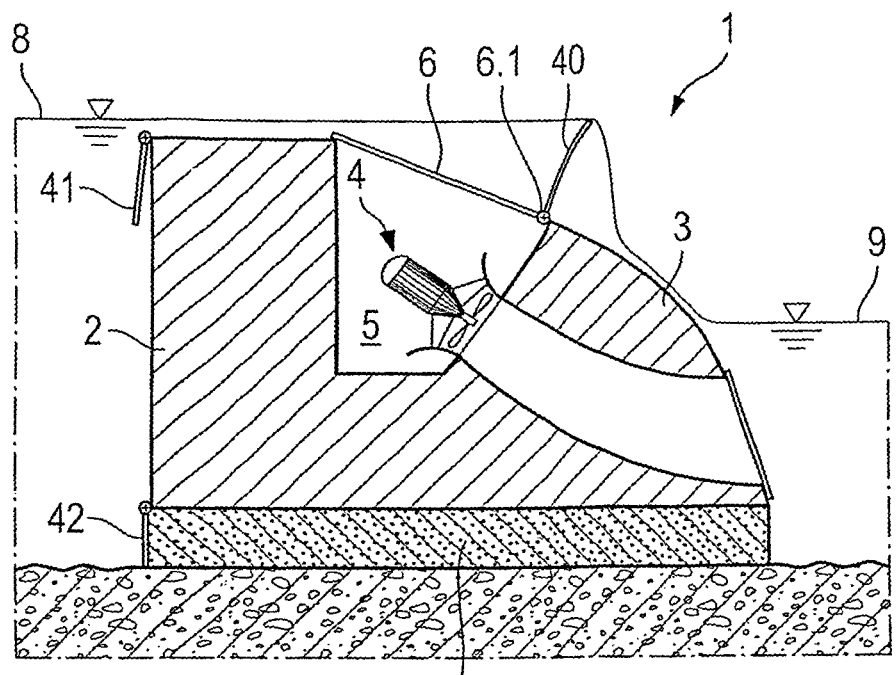
FIGS. 19, 20, 21 show a further water power plant in front elevational view, and more precisely in three different operating phases.

The air vane 40 is folded up in the operating phase according to FIG. 19. Consequently, the gauge of the upper water 8 lies above the upper edge of the retaining wall 2.

Figure 20:
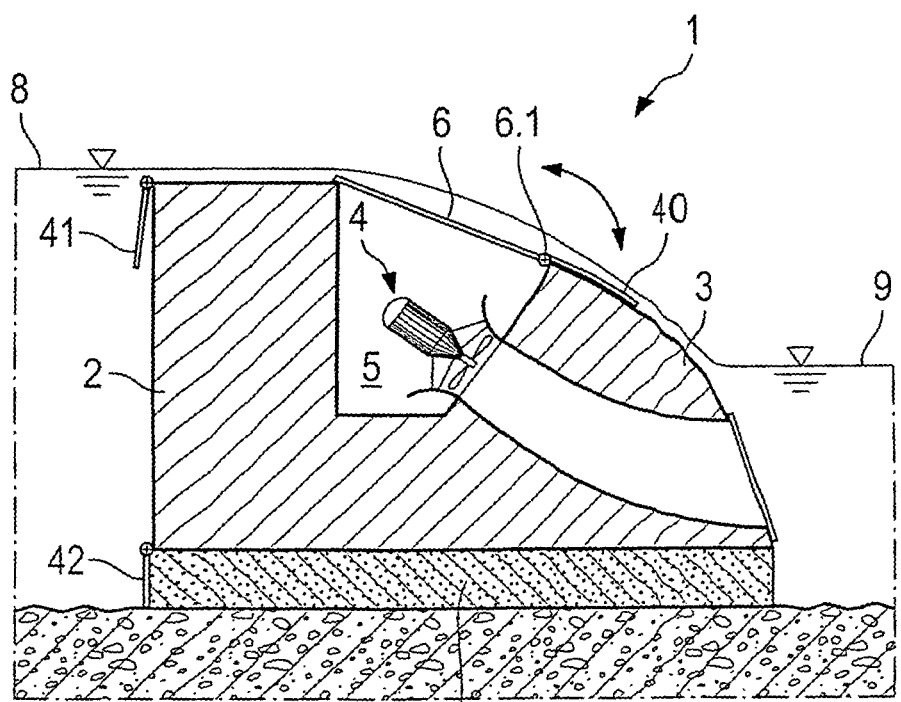

In the operating phase according to FIG. 20, the air vane 40 is folded down and rests on the overflow surface of the bearing wall 3. The rake 6 is cleaned during this phase.

Figure 21:
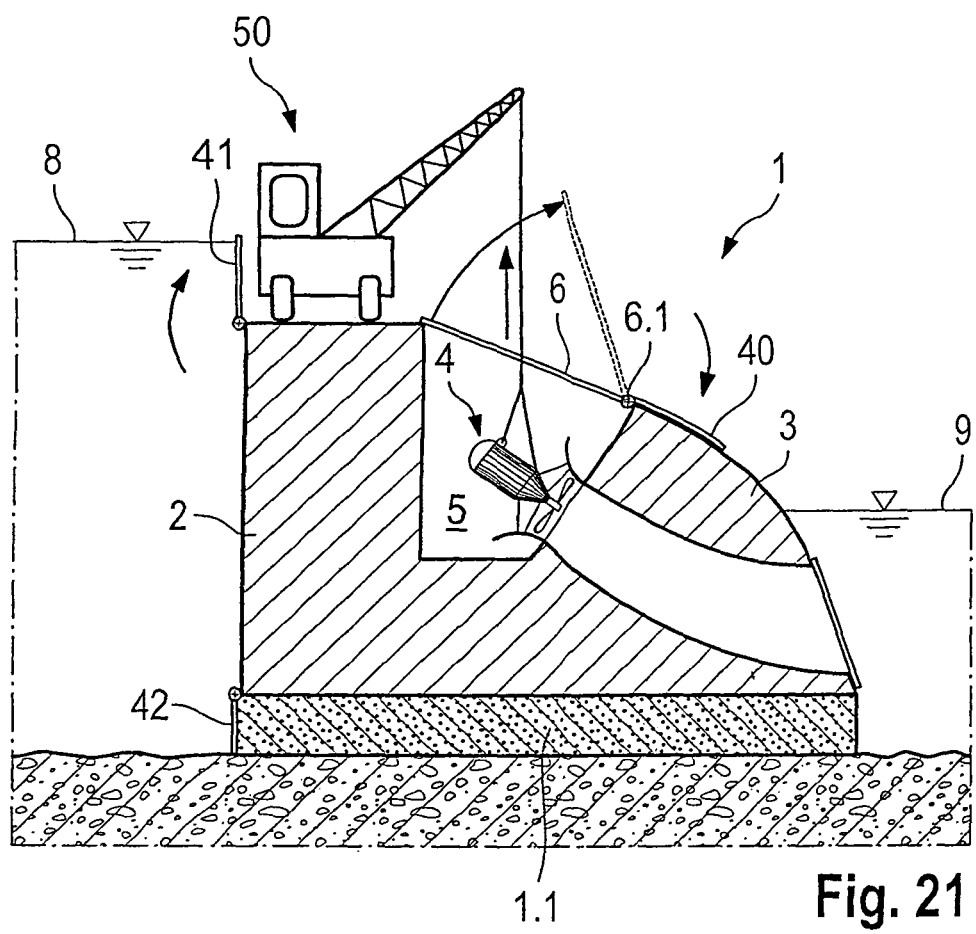

In the operating phase illustrated in FIG. 21, the air vane 40 is again folded down. The rake 6 is folded up on the spot—see the dotted line. A crane vehicle 50 is situated on the crown of the bearing wall 2 and is ready to pull up the energy unit 4 for the purpose of maintenance work and consequently to transport it on land.

Besides, a further air vane 41 is clearly visible on the upper edge of the retaining wall 2 exposed to the flow. Said air vane is folded down in FIGS. 19 and 20, folded up in FIG. 21, which is necessary during the performance of the works with the crane vehicle 50.

The gravel channel 1.1 can be shut off by a further flap 42. Said channel is shut off for most of the operation so that the flap is in the position represented in FIGS. 19 and 20. The flap 42 is swung upwards for flushing the gravel channel 1.1.

Other elements can be provided instead of the pivoting flaps 40, 41, 42 illustrated here. It is also quite possible to provide a slide instead of the swiveling flap, with a slide plate running vertically, which can be extended out of the bearing wall and again retracted into it. The same goes for the flap 41 as well as for the flap 42.

The invention offers numerous advantages, as summed up below:

The structural means to be implemented and hence the investment costs can be lowered drastically. The modular construction is here of crucial importance. Every module can have the same design or be completely identical with the other modules.

The power plant dam can be built gradually starting from the shore. A first module is installed first of all close to the shore. Said module can be used as a platform for the erection of a neighbouring module, and so forth, until completion of the whole dam structure. The design of the rakes simplifies maintenance works and hence makes them cheaper.

Contrary to the conventional procedure, the sheet pile walls are not only used temporarily. In fact, they become an integral part of the power plant inasmuch as they remain anchored fixedly in the riverbed contribute substantially to the support of the whole construction. They hence fulfil a twofold function.

The modular construction offers longer service life of the power plant. A limited number of modules can first of all be fabricated, and the power plant can be extended by adding additional modules at a much later stage (possibly after several years).

The modules are constituted as a single-part. However, every module can also be built of two or several parts.

The modular construction can be realised also with existing installations, for example by attaching it to an existing weir.

LIST OF REFERENCE NUMERALS

1 Module
1.1 Free intermediate space
1.2 Shut-off device
2 Retaining wall
3 Bearing wall
3.1 Guide groove
4 Energy unit
4.1 Crane hook
4.2 Inlet funnel
5 Interspace
6 Rake
6.1 Joint
6.2 Lifting device
6.3 Skirt
7 Riverbed
7.1 Embankment
8 Upper water
9 Underwater
10 Flow direction
11 Layer of lean concrete
13 Suction channel
13.1 Suspension journals
20 Sheet pile wall
21 Sheet pile wall
22 Dam board
23 Dam board
24 Caisson
25 Stakes
26 Stakes
27 Stakes
28 Stakes
30 Sealing member
31 Interspace
41 Air vane
42 Shut-off flap
50 Crane vehicle

The invention claimed is:

1. A run-of-river power plant comprising:
a plurality of modules arranged close to one another in a flow direction, each of the plurality of modules comprising at least one energy unit;
each energy unit comprising a water turbine and a generator;
each of the plurality of modules including an upstream retaining wall, a downstream bearing wall, and an intermediate space situated between the retaining wall and the downstream bearing wall;
each of the plurality of modules including a rake, the rake extending between an upper edge of the retaining wall and an upper edge of the bearing wall and covering the intermediate space;
a suction channel connected to each energy unit;
each energy unit is carried by the hearing wall and is situated in the intermediate space;
the intermediate space is V-shaped, the intermediate space including a vertical section positioned in the flow direction;
the energy unit can be inserted from above into the bearing wall.

2. The run-of-river power plant according to claim 1, wherein the plurality of modules have the same design or are identical to each other.

3. The run-of-river power plant according to claim 2, wherein the retaining wall and the bearing wall are fixedly connected together in the region of the riverbed.

4. The run-of-river power plant according to claim 3, wherein the plurality of modules rest on a layer of lean concrete.

5. The run-of-river power plant according to claim 4, wherein the retaining wall and the bearing wall consist of a single concrete body.

6. The run-of-river power plant according to claim 2, wherein the retaining wall and the bearing wall consist of a single concrete body.

7. The run-of-river power plant according to claim 3, wherein the retaining wall and the bearing wall consist of a single concrete body.

8. The run-of-river power plant according to claim 1, wherein the retaining wall and the bearing wall are made of concrete.

9. The run-of-river power plant according to claim 8, wherein the retaining wall and the bearing wall are fixedly connected together in the region of the riverbed.

10. The run-of-river power plant according to claim 9, wherein the plurality of modules rest on a layer of lean concrete.

11. The run-of-river power plant according to claim 10, wherein the retaining wall and the bearing wall consist of a single concrete body.

12. The run-of-river power plant according to claim 8, wherein the retaining wall and the bearing wall consist of a single concrete body.

13. The run-of-river power plant according to claim 9, wherein the retaining wall and the bearing wall consist of a single concrete body.

14. The run-of-river power plant according to claim 1, wherein the retaining wall and the bearing wall are fixedly connected together in the region of the riverbed.

15. The run-of-river power plant according to claim 14, wherein the plurality of modules rest on a layer of lean concrete.

16. The run-of-river power plant according to claim 15, wherein the retaining wall and the bearing wall consist of a single concrete body.

17. The run-of-river power plant according to claim 14, wherein the retaining wall and the bearing wall consist of a single concrete body.

18. The run-of-river power plant according to claim 1, wherein each energy unit is articulated to the bearing wall at the upper end of an inlet opening of the suction channel and can be swiveled around a horizontal axis.

19. The run-of-river power plant according to claim 1, wherein the plurality of modules are stand-alone modules.

20. The run-of-river power plant according to claim 1, wherein:
- the turbine is seamless;
- a rotor of the turbine is mounted in a concentric bushing to a rotational axis of the turbine;
- turbine blades are fixed to the concentric bushing by radially external ends;
- radially internal ends of the turbine blades form together a passage for a penetration of floating debris.

* * * * *

UNITED STATES PATENT AND TRADEMARK OFFICE
CERTIFICATE OF CORRECTION

| | | |
|---|---|---|
| PATENT NO. | : 8,845,231 B2 | Page 1 of 1 |
| APPLICATION NO. | : 13/318668 | |
| DATED | : September 30, 2014 | |
| INVENTOR(S) | : Holstein et al. | |

It is certified that error appears in the above-identified patent and that said Letters Patent is hereby corrected as shown below:

In the claims,

Column 6, line 52, "hearing wall" should be changed to --bearing wall--.

Signed and Sealed this
Twenty-fourth Day of February, 2015

Michelle K. Lee
*Deputy Director of the United States Patent and Trademark Office*